US012693225B2

(12) United States Patent
Maier et al.

(10) Patent No.: US 12,693,225 B2
(45) Date of Patent: Jul. 28, 2026

(54) METHODS AND SYSTEMS FOR RAMAN SPECTRA-BASED IDENTIFICATION OF CHEMICAL COMPOUNDS

(71) Applicant: GENENTECH, INC., South San Francisco, CA (US)

(72) Inventors: Andrew James Maier, Oakland, CA (US); Raphael Fish, San Diego, CA (US); Brendan Reed Huang, Berkeley, CA (US)

(73) Assignee: Genentech, Inc., South San Francisco, CA (US)

( * ) Notice: Subject to any disclaimer, the term of this patent is extended or adjusted under 35 U.S.C. 154(b) by 282 days.

(21) Appl. No.: 18/447,809

(22) Filed: Aug. 10, 2023

(65) Prior Publication Data

US 2024/0011910 A1     Jan. 11, 2024

Related U.S. Application Data

(63) Continuation of application No. PCT/US2022/070949, filed on Mar. 3, 2022.

(60) Provisional application No. 63/156,846, filed on Mar. 4, 2021.

(51) Int. Cl.
*G01J 3/44* (2006.01)
*G01N 21/65* (2006.01)

(52) U.S. Cl.
CPC ................ *G01N 21/65* (2013.01); *G01J 3/44* (2013.01)

(58) Field of Classification Search
CPC .................. G01N 21/65; G01N 21/31; G01N 2021/6417; G01J 3/44; G01J 3/10; G01J 3/02
See application file for complete search history.

(56) References Cited

U.S. PATENT DOCUMENTS 9,200,962 B1 * 12/2015 Russin ...................... G01J 3/44
9,494,581 B2 11/2016 Carron et al.
2011/0087439 A1 4/2011 Ziegler et al.
(Continued)

FOREIGN PATENT DOCUMENTS

CN 104568908 4/2015
JP 2014215091 11/2014
JP 2014219358 11/2014

OTHER PUBLICATIONS

Lawson, LS et al., "Raman Barcode for Counterfeit Drug Product Detection", *Analytical Chemistry*, 88(9); 4706-4713, 2016.
(Continued)

*Primary Examiner* — Abdullahi Nur
(74) *Attorney, Agent, or Firm* — Norton Rose Fulbright US LLP

(57) ABSTRACT
A method and System for identifying chemical compounds based on Raman spectroscopic measurements and in-silico simulated Raman spectra are disclosed. In various embodiments, Raman barcodes of an unknown chemical compound may be generated from Raman spectra obtained by performing Raman spectroscopic measurements on the unknown chemical compound. The Raman barcodes may then be compared with a library of reference in-silico simulated Raman barcodes of known chemical compounds and the identity of the unknown chemical compound may be determined based on the comparison.

21 Claims, 7 Drawing Sheets

(56)　　　　　　References Cited

U.S. PATENT DOCUMENTS

2011/0134421 A1 *　6/2011　Baldwin ................... G01J 3/44
　　　　　　　　　　　　　　　　　　356/301
2012/0065614 A1 *　3/2012　Omary ................... B82Y 20/00
　　　　　　　　　　　　　　　　　　424/9.1
2017/0153435 A1 *　6/2017　Alfano ............... G02B 21/0032

OTHER PUBLICATIONS

Taplin, F. et al., "Application of Raman Spectroscopy, Surface-Enhanced Raman Scattering (SERS), and Density Functional Theory for the Identification of Phenethylamines", *Applied Spectroscopy*, 67(10); 1150-1159, 2013.
International Search Report and Written Opinion issued in corresponding PCT Application No. PCT/US2022/070949, mailed Jun. 2, 2022.

* cited by examiner

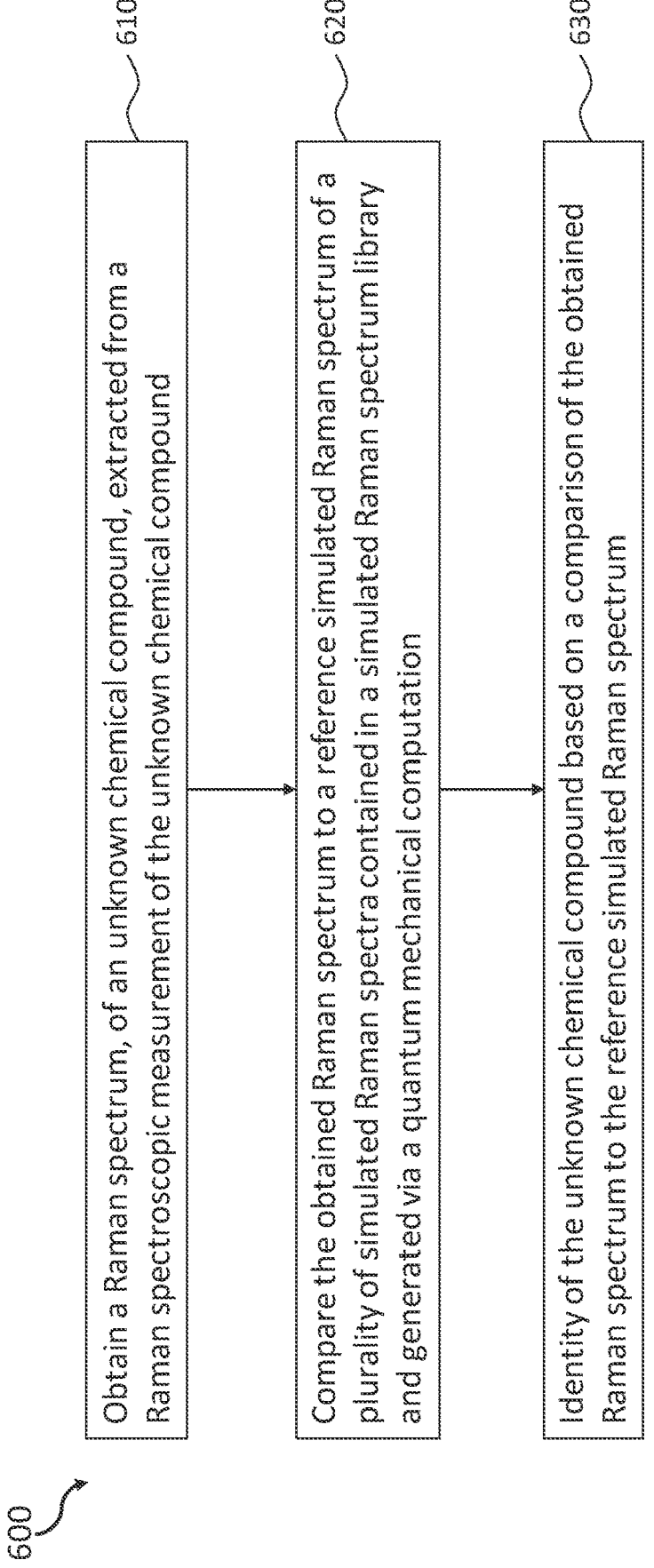

600

610

Obtain a Raman spectrum, of an unknown chemical compound, extracted from a Raman spectroscopic measurement of the unknown chemical compound

620

Compare the obtained Raman spectrum to a reference simulated Raman spectrum of a plurality of simulated Raman spectra contained in a simulated Raman spectrum library and generated via a quantum mechanical computation

630

Identity of the unknown chemical compound based on a comparison of the obtained Raman spectrum to the reference simulated Raman spectrum

FIG. 6

METHODS AND SYSTEMS FOR RAMAN SPECTRA-BASED IDENTIFICATION OF CHEMICAL COMPOUNDS

CROSS-REFERENCE TO RELATED APPLICATIONS

The application is a Continuation application under the benefit of 35 U.S.C. 365(c) of International Application No. PCT/US2022/070949, filed Mar. 3, 2022, which claims the benefit of priority to U.S. Provisional Patent Application Ser. No. 63/156,846, filed Mar. 4, 2021, hereby incorporated by reference in its their entirety.

FIELD

This application relates to the classification and identification of chemical compounds using the Raman spectra of the chemical compounds, and more particularly, by comparing the measured Raman spectra of the chemical compounds to a reference library of in-silico simulated Raman spectra.

INTRODUCTION

Raman spectroscopy is a spectral measurement technique where light incident on a sample is inelastically scattered, i.e., the frequency of the scattered light is different from the frequency of the incident light. The change in frequency, or equivalently change in energy, is due the interaction of the light with the low energy modes of the chemical bonds of the sample. The Raman spectrum of the sample can be determined from the scattered light, and can be used to identify and classify the sample.

SUMMARY

The following summarizes various embodiments of the present disclosure to provide a basic understanding of the discussed technology. This summary is not an extensive overview of all contemplated features of the disclosure and is intended neither to identify key or critical elements of all embodiments of the disclosure nor to delineate the scope of any or all embodiments of the disclosure. Its sole purpose is to present some concepts of one or more embodiments of the disclosure in summary form as a prelude to the more detailed description that is presented later.

Various embodiments of the present disclosure disclose a method comprising obtaining a Raman spectrum, of an unknown chemical compound, extracted from a Raman spectroscopic measurement of the unknown chemical compound. In various embodiments, the method further comprises comparing the obtained Raman spectrum to a reference simulated Raman spectrum of a plurality of simulated Raman spectra contained in a simulated Raman spectrum library. In various embodiments, each simulated Raman spectra is generated via a quantum-mechanical computation of a known chemical compound. The method further comprises identifying an identity of the unknown chemical compound based on a comparison of the obtained Raman spectrum to the reference simulated Raman spectrum.

Various embodiments of the present disclosure disclose a system comprising a non-transitory memory storing instructions and one or more hardware processors coupled to the non-transitory memory and configured to read the instructions from the non-transitory memory to cause the system to perform operations. In various embodiments, the operations comprise obtaining a Raman spectrum, of an unknown chemical compound, extracted from a Raman spectroscopic measurement of the unknown chemical compound. In various embodiments, the operations further comprise comparing the obtained Raman spectrum to a reference simulated Raman spectrum of a plurality of simulated Raman spectra contained in a simulated Raman spectrum library. In various embodiments, each simulated Raman spectra is generated via a quantum-mechanical computation of a known chemical compound. The operations further comprise identifying an identity of the unknown chemical compound based on a comparison of the obtained Raman spectrum to the reference simulated Raman spectrum.

Various aspects of the present disclosure disclose a non-transitory computer-readable medium (CRM) having stored thereon computer-readable instructions executable to cause performance of operations. In various embodiments, the operations comprise obtaining a Raman spectrum, of an unknown chemical compound, extracted from a Raman spectroscopic measurement of the unknown chemical compound. In various embodiments, the operations further comprise comparing the obtained Raman spectrum to a reference simulated Raman spectrum of a plurality of simulated Raman spectra contained in a simulated Raman spectrum library. In various embodiments, each simulated Raman spectra is generated via a quantum-mechanical computation of a known chemical compound. The operations further comprise identifying an identity of the unknown chemical compound based on a comparison of the obtained Raman spectrum to the reference simulated Raman spectrum.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, medium, or method embodiments it should be understood that such exemplary embodiments can be implemented in various devices, Systems, media, and methods.

BRIEF DESCRIPTION OF THE DRAWINGS

For a more complete understanding of the principles disclosed herein, and the advantages thereof, reference is now made to the following descriptions taken in conjunction with the accompanying drawings, in which:

FIG. 6 is a flowchart of a method for identifying an unknown chemical compound based on a comparison of the measured Raman barcode of the chemical compound to a library of reference in-silico simulated Raman barcodes of chemical compounds, in accordance with various embodiments.

Figure 1:
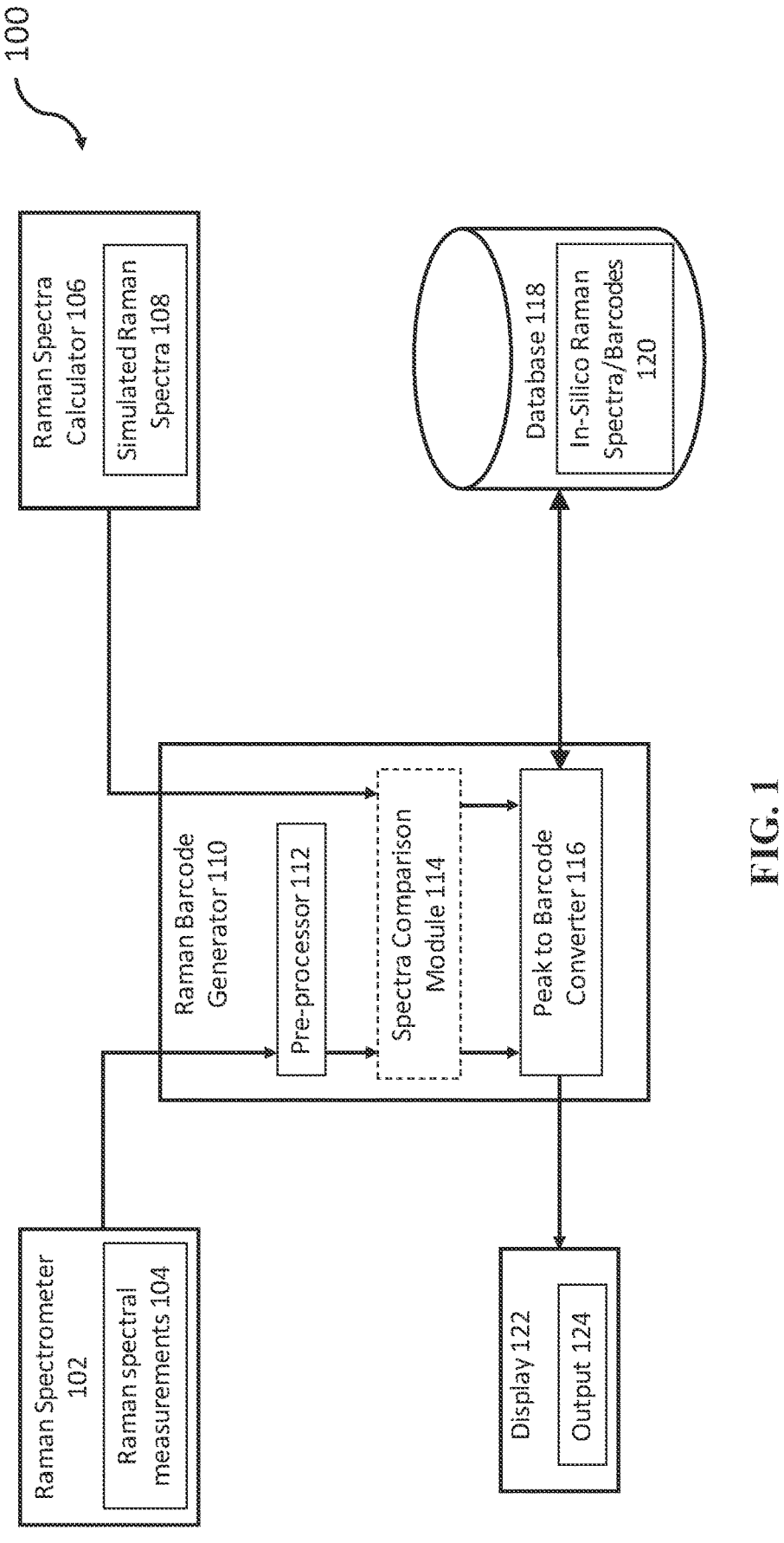
FIG. 1 is a block diagram of Raman spectra-based chemical compound classification system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, Systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Unknown chemical compounds can be identified and classified based on their Raman spectra, which may be measured using the technique of Raman spectroscopy where light scattered from the unknown chemical compounds is analyzed to extract the Raman spectra. To identify/classify an unknown chemical compound, the Raman spectrum of the unknown chemical compound obtained via a Raman spectroscopic measurement may be compared with a library of reference Raman spectra that includes measured Raman spectra of various chemical compounds, and the unknown chemical compound may be identified/classified (e.g., using a classification algorithm) when the comparison yields a match. For example, the peaks of the measured Raman spectrum of the unknown chemical compound may be compared with the peaks of the measured Raman spectrum, of a candidate chemical compound, stored in a library of reference Raman spectra, and the unknown chemical compound may be identified to be the same chemical compound as the candidate chemical compound when at least a predetermined portion of the peaks of the measured Raman spectrum are located at the same or substantially the same wavenumbers as the peaks of the Raman spectrum of the candidate chemical compound. The term "measured Raman spectrum" is understood to refer to Raman spectrum experimentally obtained using a spectroscopic instrument such as a Raman spectrometer.

Developing a robust library of reference Raman spectra of chemical compounds (i.e., a library of measured Raman spectra that can be used as reference spectra), however, can be technically challenging. For example, experimental measurements to build up the library of reference Raman spectra using an instrument such as a spectrometer can be affected by factors such as but not limited to instrument detector noise, instrument-to-instrument variability, instrument configuration (e.g., laser power, laser frequency, etc.), sample vessel interference, etc., which may cause variations in spectral quality and feature appearances and complicate the effort to build a reliable and robust library. Additionally, these factors can make it difficult to append the spectra of additional molecules or chemical compounds to an existing library, and also to translate classification methods or algorithms from one instrument or spectrometer to another. Further, baseline removal techniques applied to measured Raman spectra may also remove true signals resulting in the loss of usable information. For example, techniques applied to measured Raman spectra to smooth out noise or background may also smooth multiple but close peaks into a single peak, resulting in the loss of valuable signal information. In addition, Raman spectral measurements of toxic or hazardous molecules or chemical compounds can also be costly and challenging because of, among other things, required experimental safeguards. As such, there is a need for methods and systems that facilitate the development of robust Raman spectra library that one can use to address the afore-mentioned shortcomings of a library of reference (measured) Raman spectra when using such a library to identify and classify an unknown chemical compound.

Various embodiments of the present disclosure disclose a library of reference Raman spectra of chemical compounds that are generated in-silico, i.e., simulated or calculated Raman spectra (e.g., as opposed to measured Raman spectra). The use of such in-silico simulated Raman spectra for, for instance, identifying unknown chemical compounds or molecules may have several advantages. For example, in-silico simulated Raman spectra do not suffer from sample or instrument/spectrometer variability. For instance, in-silico simulated Raman spectra do not contain false peaks that appear in measured Raman spectra due to sample contaminations. That is, in-silico simulated Raman spectra are the same for the same chemical compound provided the same computational methods are used to calculate the Raman spectra (e.g., and as such, it is sufficient for a library to contain only a single Raman spectrum for a given chemical compound, in contrast to libraries of measured Raman spectra that contain multiple Raman spectra replicas for the same chemical compound). Further, the operational challenges and costs associated with measuring the Raman spectra of toxic substances are not present when generating in-silico simulated Raman spectra.

FIG. 1 is a block diagram of Raman spectra-based chemical compound classification system 100, in accordance with various embodiments. In various embodiments, an instrument such as a Raman spectrometer 102 may be used to obtain Raman spectral measurements 104 of chemical compounds. In various instances, a Raman spectrometer 102 may emit light towards a sample (e.g., molecules, chemical compounds, etc.) and detect light that is scattered after interacting with the ow energy vibrational, rotational, etc., modes of the sample. The Raman spectrum of a sample shows the intensity of the scattered light as a function of the difference between the frequencies of the scattered light and the incident light. Because the intensities and frequency changes can depend on the chemical components of the samples, in various cases, the Raman spectral measurements 104 of different molecules, chemical compounds, etc., may be different from each other and as such can be used to identify and classify the molecules, chemical compounds, etc.

In various embodiments, the Raman spectra-based chemical compound classification system 100 may also include a Raman spectra calculator 106 that is configured to calculate or simulate the simulated Raman spectra 108 of molecules, chemical compounds, etc. based on, among other things, the material and/or chemical structures of the same. That is, provided the material and/or chemical structure of a chemical compound, the Raman spectra calculator 106 may be configured to generate in-silico simulated Raman spectrum of the chemical compound. In various instances, the Raman spectra calculator 106 may include a computing node that includes a memory which is coupled to a processor that is configured to control the operations of the computing node. In various cases, the processor can be or include one or more central processing units, multi-core processors, microprocessors, microcontrollers, digital signal processors, field programmable gate arrays (FPGAs), application specific integrated circuits (ASICs), graphics processing units (GPUs) and/or the like. The computing node may be implemented as a stand-alone subsystem, as a board added to a computing device, and/or as a virtual machine.

In various embodiments, the Raman spectra calculator 106 may include modules that are designed or configured to calculate or simulate, as noted above, the simulated Raman spectra 108 of molecules, chemical compounds, etc. based on, among other things, the material and/or chemical structures of the same. In various instances, such modules may have the capability to perform quantum mechanical calculations such as but not limited to density functional theory (DFT) calculations to compute the simulated, i.e., in-silico Raman spectra 108. For example, such modules can be or include any of the series of Gaussian softwares (e.g., Gaussian09, Gaussian 16, etc.) by Gaussian, Inc. In various instances, Gaussian softwares may take the 3D structure of a chemical compound as an input and perform a DFT calculation (e.g., the density functional method of B3LYP with 6-31G(d) basis set) to generate the in-silico simulated Raman spectra 108. In various cases, the input file that includes the 3D structure may be generated by a Gaussian software extension of the Avogardo chemical modeling software that imports the 3D structure of the chemical and outputs the input file that may be used as an input for Gaussian 09.

In various embodiments, the Raman spectra-based chemical compound classification system 100 may also include a Raman barcode generator 110 that is configured to receive Raman spectral measurements 104 generate Raman barcodes of the spectral measurements. In various instances, the Raman barcode generator 110 may include a spectral measurement pre-processor 112 that is configured to receive the Raman spectral measurements 104 from the Raman spectrometer 102 and pre-process the Raman spectral measurements 104 to perform baseline correction including but not limited to smoothing the spectra (e.g., to remove high frequency noises), removing Gaussian noise, fluorescence background, cosmic spikes, experimental artifacts, etc.

In various embodiments, the Raman barcode generator 110 may be configured to compare the Raman spectral measurements 104 with the simulated Raman spectra 108 (e.g., prior to generating Raman barcodes of the respective Raman spectra). For example, the Raman barcode generator 110 may include an optional spectra comparison module 114 that is configured to receive a pre-processed Raman spectral measurement from the spectral measurement pre-processor 112 and an in-silico simulated Raman spectrum 108 from the Raman spectra calculator 106 to compare the peaks thereof (e.g., to determine if the chemical compounds corresponding to the measured Raman spectra (e.g., from 104) and the simulated Raman spectrum 108 are matches). In various cases, comparing the peaks of the pre-processed Raman spectral measurement and the in-silico simulated Raman spectrum 108 may include checking to determine whether at least a substantial number of the peaks of one of the spectra are also present in the other spectra at same or substantially similar wavenumber locations (e.g., after wavenumber offset between the spectra, if any, is corrected). In other words, comparing the peaks of the pre-processed Raman spectral measurement and the in-silico simulated Raman spectrum 108 may include checking to determine whether the wavenumber locations of at least a substantial number of the peaks of the pre-processed Raman spectral measurement and the in-silico simulated Raman spectrum 108 align (e.g., after wavenumber offset between the spectra, if any, is corrected). In various instances, said peaks may be peaks that have intensities exceeding a threshold intensity level. In various cases, comparing the peaks of the pre-processed Raman spectral measurement and the in-silico simulated Raman spectrum 108 may include checking to determine whether the aligned peaks (i.e., peaks from the pre-processed Raman spectral measurement and the in-silico simulated Raman spectrum 108 that are located or aligned at the same or substantially similar wavenumber location) have at least substantially the same intensities. In various cases, peaks may be understood to "align" with each other or be located at "same or substantially same" wavenumber location if the peaks are located (e.g., after wavenumber offset between the spectra, if any, is corrected) within about 0.5%, about 1%, about 3%, about 5%, about 10%, including values and subranges therebetween, of each other.

In various instances, prior to comparing the peaks of the measured and simulated spectra as discussed above, the spectra comparison module 114 may apply a scaling algorithm to one or both spectra to correct any wavenumber offset therebetween. In various cases, the scaling algorithm may be applied to the pre-processed Raman spectral measurement and/or the in-silico simulated Raman spectrum 108. The scaling algorithm can be an algorithm derived based of measurements performed on some other reference chemical compound. For instance, the scaling algorithm may include or be a linear scaling equation derived from measurements performed on the compound indene. An example of such a linear scaling equation may read $v_{meas}/v_{calc}=1.0-0.00002520 \, v_{calc}$, where $V_{meas}$ and $V_{calc}$ are the measured and calculated wavenumbers. In various instances, the scaling algorithm may also include an optimization function or technique (e.g., Nedler-Mead method, pattern search, simulated annealing, etc.) to derive better-fit parameters for the scaling algorithm or scaling equations.

Figure 2:
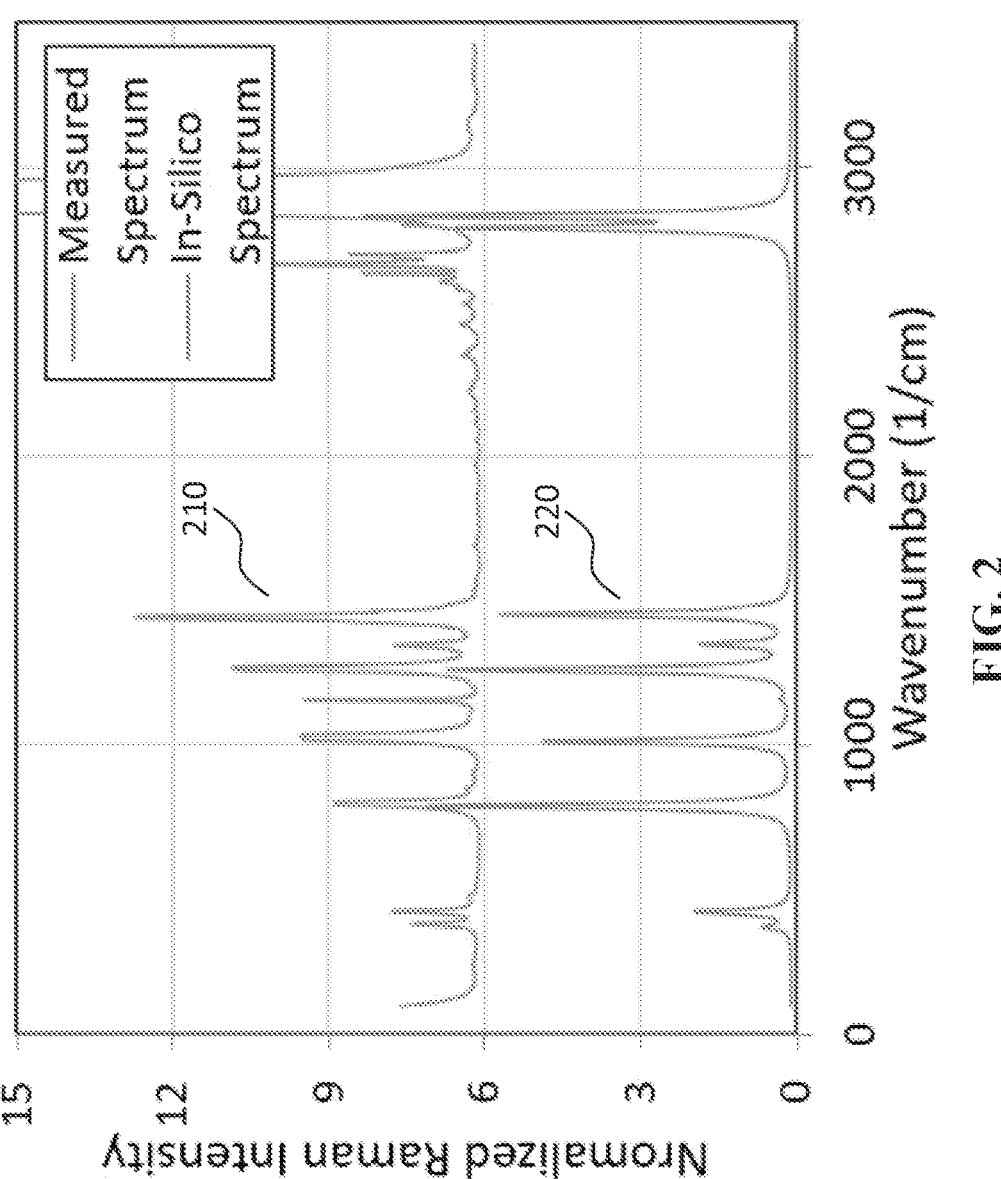
FIG. 2 shows an example illustration of the identification of a chemical compound based on a comparison of the measured and the in-silico simulated Raman spectra of the chemical compound, in accordance with various embodiments.

An example illustration of the comparison of a measured Raman spectrum to an in-silico simulated spectrum is shown in FIG. 2 which includes example measured and in-silico simulated spectra of cyclohexane ($C_6H_{12}$). FIG. 2 depicts an example plot 200 illustrating the identification of an unknown chemical compound, in this case cyclohexane, based on a comparison of the measured and the in-silico simulated Raman spectra of the chemical compound, in accordance with various embodiments. In various instances, the Raman spectra of an unknown chemical compound can be measured and processed to obtain the pre-processed measured Raman spectrum 210 of that unknown compound. The pre-processed measured Raman spectrum 210 may then be compared to one or more in-silico simulated Raman spectra (e.g., from a library of in-silico simulated Raman spectra of various chemical compounds) to identify a matching in-silico simulated Raman spectrum 220. For instance, with reference to FIG. 2, the pre-processed measured Raman spectrum 210 may be compared to a library of in-silico simulated Raman spectra until the pre-processed measured Raman spectrum 210 is determined to match the in-silico simulated Raman spectrum 220 of cyclohexane stored in the library of in-silico simulated Raman spectra, after which the unknown chemical compound corresponding to the measured Raman spectrum may be identified as cyclohexane. In various instances, the determination of the matching of the pre-processed measured Raman spectrum 210 and the in-silico simulated Raman spectrum 220 may be based on the peaks of the two spectra that are present or are aligned at the same or substantially same wavenumber locations. For example, the two spectra 210, 220 may be determined to match when at least a pre-determined number of peaks of the spectra are located at the same or substantially the same wavenumber location (e.g., after a wavenumber offset between the spectra, if any, is corrected as discussed above). In various cases, these peaks may be peaks having intensities exceeding a threshold intensity level.

In various instances, multivariate data analysis (MVDA) techniques may be used to compare the pre-processed measured Raman spectrum 210 and the in-silico simulated Raman spectrum 220 for classification purposes, for example, to classify the former with respect to the latter. Examples of MDVA techniques include PCA (principal component analysis) and PLSD (partial least squares discriminant) techniques that are used to perform analysis on data with a large number of variables and a large number of samples. In various instances, MDVA techniques such as PCA, PLSD, etc., may be applied to a large number of data points (e.g., about 3,000, ranging from about 1,000 to about 5,000, etc., including values and subranges therebetween) along a measured Raman spectrum to project the data points into a dimensional space with fewer dimensions than that of the initial dataset of the large number of data points. In such cases, the Raman spectrum may then be classified based on the grouping of the projected data points in the dimensional space with the fewer dimensions.

In various embodiments, the pre-processed measured Raman spectrum 210 may be compared to in-silico simulated spectra in a library of in-silico simulated Raman spectra by comparing the similarity of the raw-spectra vectors of the pre-processed measured Raman spectrum 210 and the in-silico simulated Raman spectra. For example, the similarity may be measured using distance metrics to calculate the "distance" between the vectors in vector space. An example of such a metric is Euclidean metric, and the Euclidean distance and/or covariance of the raw-spectra vectors of the pre-processed measured Raman spectrum 210 and the in-silico simulated spectra may be calculated to quantify the level of similarity between the former and latter.

In various embodiments, the Raman barcode generator 110 may be configured to convert the peaks of one or both of the Raman spectral measurement pre-processed by the spectral measurement pre-processor 112 and the in-silico simulated Raman spectrum 108 from the Raman spectra calculator 106 to convert the peaks of said spectra to Raman barcodes. For example, the Raman barcode generator 110 may include a peak-to-barcode converter module 116 that is configured to receive a Raman spectrum and identify the peaks of the Raman spectrum to then generate a Raman barcode with bars representing or corresponding to the peaks and located at the same or substantially same wavenumber locations. In various instances, the Raman barcode generator 110 may include a peak detection algorithm, such as but not limited to the algorithm peakfind by Eigenvector Research, Inc, to detect the presence, and identify the wavenumber location, of a peak in a Raman spectrum. The Raman barcode generator 110 may then generate a Raman barcode and place a bar at the wavenumber location in the Raman barcode that corresponds to the peak (e.g., and represent the peak in the barcode). In various cases, the wavenumber location of a peak may be understood to refer to the wavenumber location of the tip of the peak, i.e., the wavenumber location corresponding to the highest intensity of the peak, or if the peak has a more rounded tip, the center of the rounded tip portion of the peak. In various instances, the Raman barcode generator 110 may include additional peak detection algorithms, such as those discussed in the document by F. Scholkmann et al., titled "An Efficient Algorithm for Automatic Peak Detection in Noisy Periodic and Quasi-Periodic Signals", Aug. 3, 2012, which is incorporated herein by reference in its entirety.

In various embodiments, a peak identified as such in a Raman spectrum (e.g., by a peak detection algorithm) may be included in a Raman barcode, i.e., be represented by a bar in a Raman barcode, if (e.g., and in some cases only if) the intensity of the peak exceeds a pre-determined peak intensity threshold. In various cases, the peak intensity threshold may be related to the intensities of one or more of the peaks of the Raman spectrum. For example, the peak intensity threshold may be some fraction of the highest peak of the Raman spectrum or may be an average of some or all of the peaks detected by the peak detection algorithm in the Raman spectrum.

Figure 3:
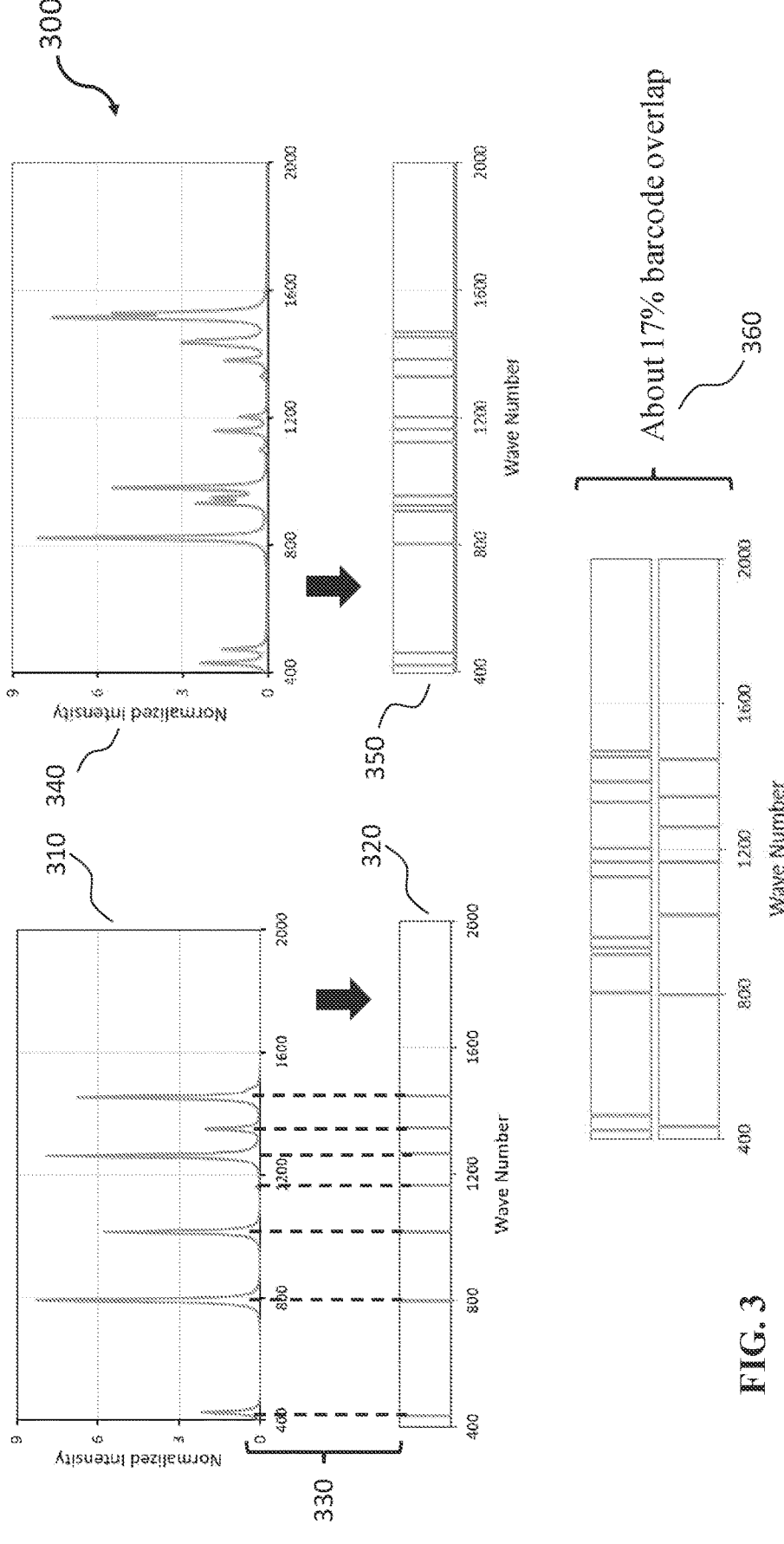
FIG. 3 shows an example illustration of the identification of chemical compounds based on a comparison of the in-silico simulated Raman barcodes of the chemical compounds, in accordance with various embodiments.

FIG. 3 shows an example illustration 300 of the identification of peaks in a Raman spectrum and the generation of Raman barcode based on the identified peaks, in various embodiments. Although the discussion herein related to the identification of peaks and the generation of Raman barcodes refers to the in-silico simulated Raman spectrum 310 of cyclohexane, in various instances, the discussion equally applies to measured Raman spectra. In various instances, a Raman spectrum may be calculated or simulated (e.g., or be measured and pre-processed) and the Raman spectrum 310 may have multiple peaks detected by a peak detection algorithm. The wavenumber locations of some of the peaks (e.g., those peaks with intensities exceeding the peak intensity threshold) or all of the peaks may then be identified and a Raman barcode 320 may be generated 330 with bars located at the identified wavenumber locations. As noted above, the wavenumber location of a peak may correspond to or be same as the wavenumber location of the tip or highest intensity value of the peak, or if the tip of the peak is rounded, the center of rounded tip portion of the peak.

In various embodiments, instead of or in addition to comparing Raman spectra to identify the identities of the chemical compounds corresponding to the Raman spectra (e.g., as shown in FIG. 2 with respect to measured and in-silico simulated Raman spectra), Raman barcodes of the Raman spectra may be compared for identification purposes, or to determine the level of similarity between the chemical compounds. FIG. 3 shows an example illustration of the comparison of in-silico simulated Raman barcodes of cyclohexane 320 and isopropyl alcohol (IPA) 350, which are converted from respective in-silico simulated Raman spectra 310 and 340 as discussed above (e.g., using peak-to-barcode converter module 116 of the Raman barcode generator 110). In various instances, the comparison may include determining the barcode overlap level 360 between the two Raman barcodes 320, 350. In various cases, when comparing two Raman barcodes (e.g., such as 320 and 350), the barcode overlap level 360 may be related to the number of bars that are present at the same or substantially the same wavenumber locations in both Raman barcodes 320, 350 (e.g., the barcode overlap level 360 may be computed by dividing that number with the total number of bars in both Raman barcodes 320, 350). In various instances, a first bar in a first Raman barcode and a second bar in a second Raman barcode are understood to be at "the same or substantially the same wavenumber location" when the first and the second bars are located (e.g., on the wavenumber axis) within about 0.5%, about 1%, about 3%, about 5%, about 10%, including values and subranges therebetween, of each other. In various cases, the barcode overlap level of two Raman barcodes may be considered as a measure of the similarity between the chemical compounds corresponding to the Raman barcodes. For example, two chemical compounds may be considered or determined to be a match when the barcode overlap level exceeds a barcode overlap threshold. In various embodiments, returning to FIG. 1, results such as the barcode overlap level 360 may be provided as output 124 by the Raman barcode generator 110 to be presented in a display 122 of the Raman spectra-based chemical compound classification system 100.

In various embodiments, in-silico simulated Raman spectra and/or the Raman barcodes converted therefrom may be stored in a simulated Raman spectra library. For example, the Raman spectra-based chemical compound classification system 100 may include a database 118 that is configured to store the simulated Raman spectra 108 and/or the in-silico simulated Raman spectra (e.g., such as in-silico simulated Raman barcodes of cyclohexane 320 and isopropyl alcohol (IPA) 350 shown in FIG. 3). That is, in various instances, an in-silico simulated Raman spectra library may be built by computing Raman spectra of various chemical compounds (e.g., by performing quantum-mechanical DFT calculations), converting these Raman spectra into Raman barcodes and storing the in-silico simulated Raman barcodes 120 in a database 118 as a simulated Raman spectra library. In various cases, the in-silico simulated Raman spectra library may also contain the computed Raman spectra. In various instances, the simulated Raman spectra library or database 118 may then be used as a reference library when identifying unknown chemical compounds by measuring their Raman spectra, converting the measured Raman spectra into Raman barcodes and comparing these Raman barcodes of the measured Raman spectra with the in-silico simulated Raman spectra library or database 118, as discussed in more detail below with respect to FIG. 4. In various embodiments, the simulated Raman spectra library or database 118 may not contain a measured Raman spectrum or a Raman barcode corresponding to a measured Raman spectrum. In other words, the in-silico simulated Raman spectra library or database 118 may be generated by computing or simulating Raman spectra and/or Raman barcodes and storing the same in the library, i.e., the library may contain only in-silico simulated Raman spectra or barcodes.

Figure 4:
FIG. 4 shows an example illustration of the identification of a chemical compound based on a comparison of the measured Raman barcode of the chemical compound to a library of reference in-silico simulated Raman barcodes of chemical compounds, in accordance with various embodiments.

FIG. 4 shows an example illustration 400 of the identification of an unknown chemical compound based on a comparison of the measured Raman barcode of the unknown chemical compound to a library of reference in-silico simulated Raman barcodes of chemical compounds, in accordance with various embodiments. In various embodiments, to determine the identity of an unknown chemical compound using Raman spectroscopy, the Raman spectrum of the unknown chemical compound may initially be measured using a Raman spectrometer. Further, the measured spectrum may be pre-processed to remove various noises, background, experimental artifacts, etc., and obtain a smoothed out or pre-processed Raman spectrum 410. In various instances, the measured Raman spectrum 410 may then be converted to a measured Raman barcode (using peak-to-barcode converter module 116 of the Raman barcode generator 110 of FIG. 1, for example) as discussed above with reference to FIG. 3.

Upon obtaining the measured Raman barcode, in various instances, the measured Raman barcode may be compared to one or more in-silico simulated Raman barcodes that are stored in a simulated Raman spectra library (e.g., stored in the database 118 of FIG. 1). For example, one may iteratively search through the stored in-silico simulated Raman barcodes of the database 118 and calculate, for each in-silico simulated Raman barcode, the barcode overlap level 430 between that in-or simulated Raman barcode and the measured Raman barcode. In various cases, the calculated levels of barcode overlap 460 of multiple chemical compounds may be lower than a barcode overlap threshold 450, and in such cases, the unknown chemical compound may be determined to not be a match (i.e., not the same, or even similar in chemical structure, etc.) to any of the multiple chemical compounds.

In various cases, however, the barcode overlap level 440 between the measured Raman barcode of the unknown chemical compound and an in-silico simulated Raman barcode of a (known or reference) chemical compound may exceed the barcode overlap threshold 450, and in such cases, the unknown chemical compound may be considered or determined to be a match, i.e., the same as (e.g., or at least similar to) the known chemical compound of the in-silico simulated Raman barcode. In various instances, there may be more than one in-silico simulated Raman barcodes having levels of barcode overlap with the measured Raman barcode exceeding the barcode overlap threshold 450. In such cases, the unknown chemical compound may be determined or considered to be a match to the chemical compound corresponding to the highest barcode overlap level (e.g., and it may be considered to be similar to the chemical compounds corresponding to the rest of the more than one in-silico simulated Raman barcodes).

Figure 5:
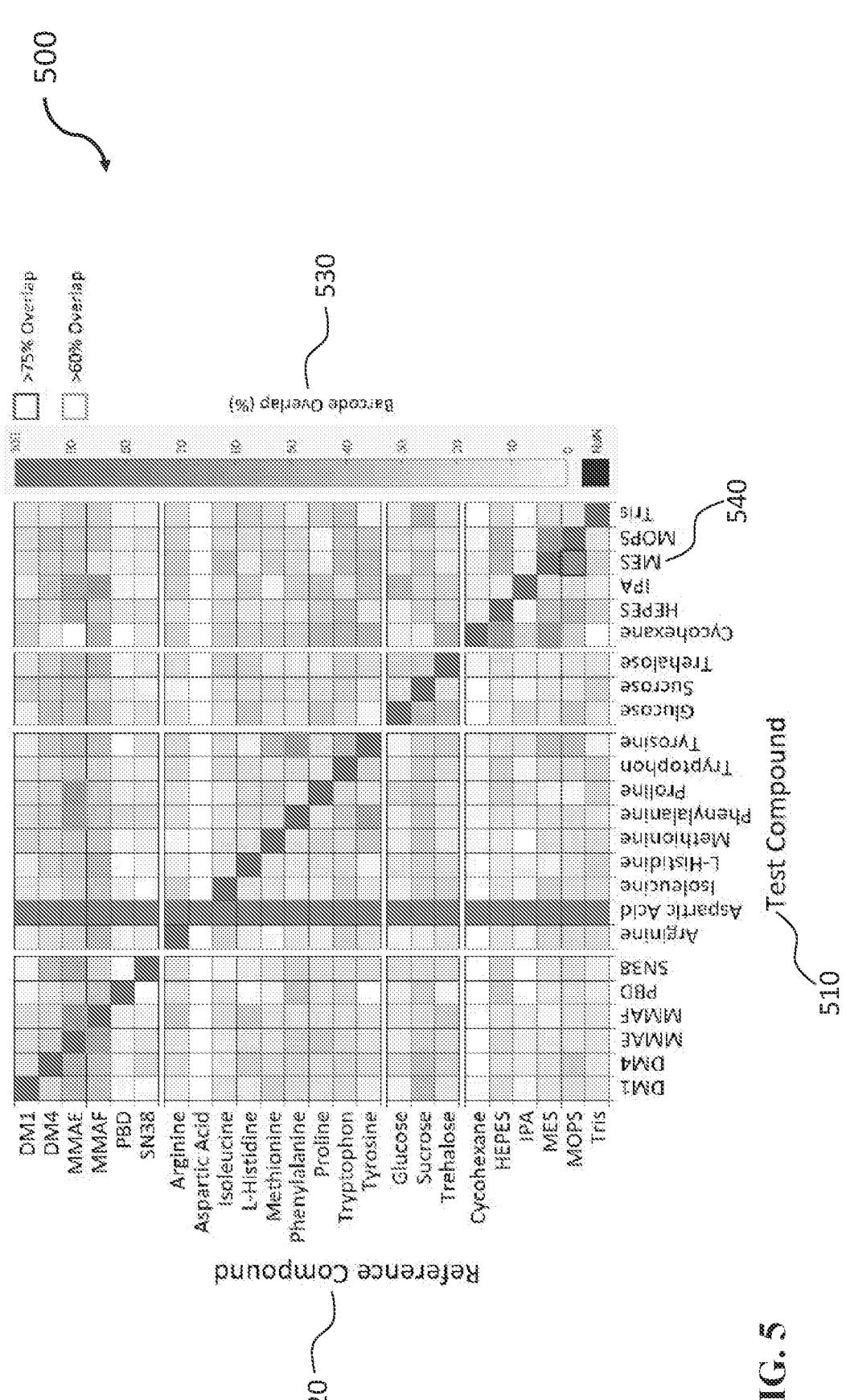
FIG. 5 shows an example grid illustrating the determination of the similarity of chemical compounds based on a comparison of measured Raman barcodes of chemical compounds to a library of reference in-silico simulated Raman barcodes of chemical compounds, in accordance with various embodiments.

In various embodiments, barcode overlap level of two Raman barcodes may be considered as a measure of the similarity between the chemical compounds corresponding to the Raman barcodes (e.g., when both chemical compounds are known a prior). FIG. 5 shows an example grid 500 illustrating the determination of the similarities of "test" chemical compounds 510 to reference compounds 520 based on a comparison, as discussed above and quantified by barcode overlap levels 530, of measured Raman barcodes of the test chemical compounds 510 to a library of reference in-silico simulated Raman barcodes of reference chemical compounds 520, in accordance with various embodiments. In various instances, the grid 500 shows a heat map of levels of barcode overlap, between measured Raman barcodes of test chemical compounds 510 and in-silico simulated Raman barcodes of reference chemical compounds 520, indicating the level of matching between each pair of a test compound and a reference compound. The measured Raman barcodes of the test compounds 510 are generated by first performing a Raman spectroscopic measurements of the test compounds 510 to obtain Raman spectra of the test compounds 510, and then converting the obtained or measured experimental Raman spectra to the Raman barcodes, while the in-silico simulated Raman barcodes of the reference compounds 520 simulated or calculated Raman barcodes, generated by calculating, using quantum-mechanical DFT computations, in-silico simulated Raman spectra of the reference compounds 520, which are then converted to the Raman barcodes. Focusing on the column corresponding to 2-(N-morpholino)

ethane sulfonic acid (MES) as a non-limiting example illustration, the grid or heat map 500 shows a high intensity (>75%) for the barcode overlap level between the test compound MES and reference compound 3-(N-morpholino) propane sulfonic acid (MOPS), indicating a high level of similarity between the two chemical compounds, while the barcode overlap level is low for that of MES and IPA, indicating that the two chemical compounds are substantially distinct. In various embodiments, the grid or heat map 500 may also be used to calibrate the barcode overlap threshold above which two chemical compounds may be considered or determined to be the same (e.g., when comparing the Raman barcode of an unknown chemical compound to a reference Raman barcode of a known chemical compound). For instance, two different chemical compounds MES and MOPS can have a barcode overlap level of >75%, the barcode overlap threshold for determining whether two chemical compounds are the same may be set higher than >75%.

FIG. 6 is a flowchart of a method for identifying an unknown chemical compound based on a comparison of the measured Raman barcode of the chemical compound to a library of reference in-silico simulated Raman barcodes of chemical compounds, in accordance with various embodiments. In various embodiments, process 600 may be implemented using Raman spectra-based chemical compound classification system 100 described in FIG. 1.

Step 610 includes obtaining a Raman spectrum, of an unknown chemical compound, extracted from a Raman spectroscopic measurement of the unknown chemical compound.

Step 620 includes comparing the obtained Raman spectrum to a reference simulated Raman spectrum of a plurality of simulated Raman spectra contained in a simulated Raman spectrum library. In various instances, each simulated Raman spectra may be generated via a quantum-mechanical computation of a known chemical compound.

Step 630 includes identifying an identity of the unknown chemical compound based on a comparison of the obtained Raman spectrum to the reference simulated Raman spectrum.

In various embodiments, process 600 further comprises generating a Raman barcode corresponding to peaks of the Raman spectrum based at least in part on intensity levels of the peaks of the Raman spectrum. In various embodiments, the comparing includes comparing the generated Raman barcode to a reference simulated Raman barcode corresponding to the reference simulated Raman spectrum of the plurality of simulated Raman spectra.

In various embodiments, the simulated Raman spectrum library excludes experimental Raman spectra obtained by performing Raman spectroscopic measurements on chemical compounds. In various embodiments, the comparing includes applying a scaling algorithm to the generated Raman barcode and/or the reference Raman barcode to correct a wavenumber offset between the generated Raman barcode and/or the reference Raman barcode.

In various embodiments, the identifying includes determining that the unknown chemical compound matches a chemical compound from which the reference simulated Raman spectrum is computed when a barcode overlap level between the generated Raman barcode and the reference simulated Raman barcodes exceeds a barcode overlap threshold. In various embodiments, the barcode overlap level indicates a number of bars located at a first wavenumber location of the generated Raman barcode and at a second wavenumber location of the reference simulated Raman barcode, the first wavenumber location and the second wavenumber location being at least substantially equal to each other.

In various embodiments, the quantum-mechanical computation is based on density-functional theory (DFT). In various embodiments, the generating includes including a bar in the barcode corresponding to a peak of the peaks when an intensity level of the peak, of the intensity levels of the peaks, exceeds a peak intensity threshold. In various embodiments, the peak intensity threshold is an average of the intensity levels of the peaks. In various embodiments, the generating includes generating the Raman barcode corresponding to the peaks of the Raman spectrum based at least in part on wavenumber locations of the peaks of the Raman spectrum.

Figure 7:
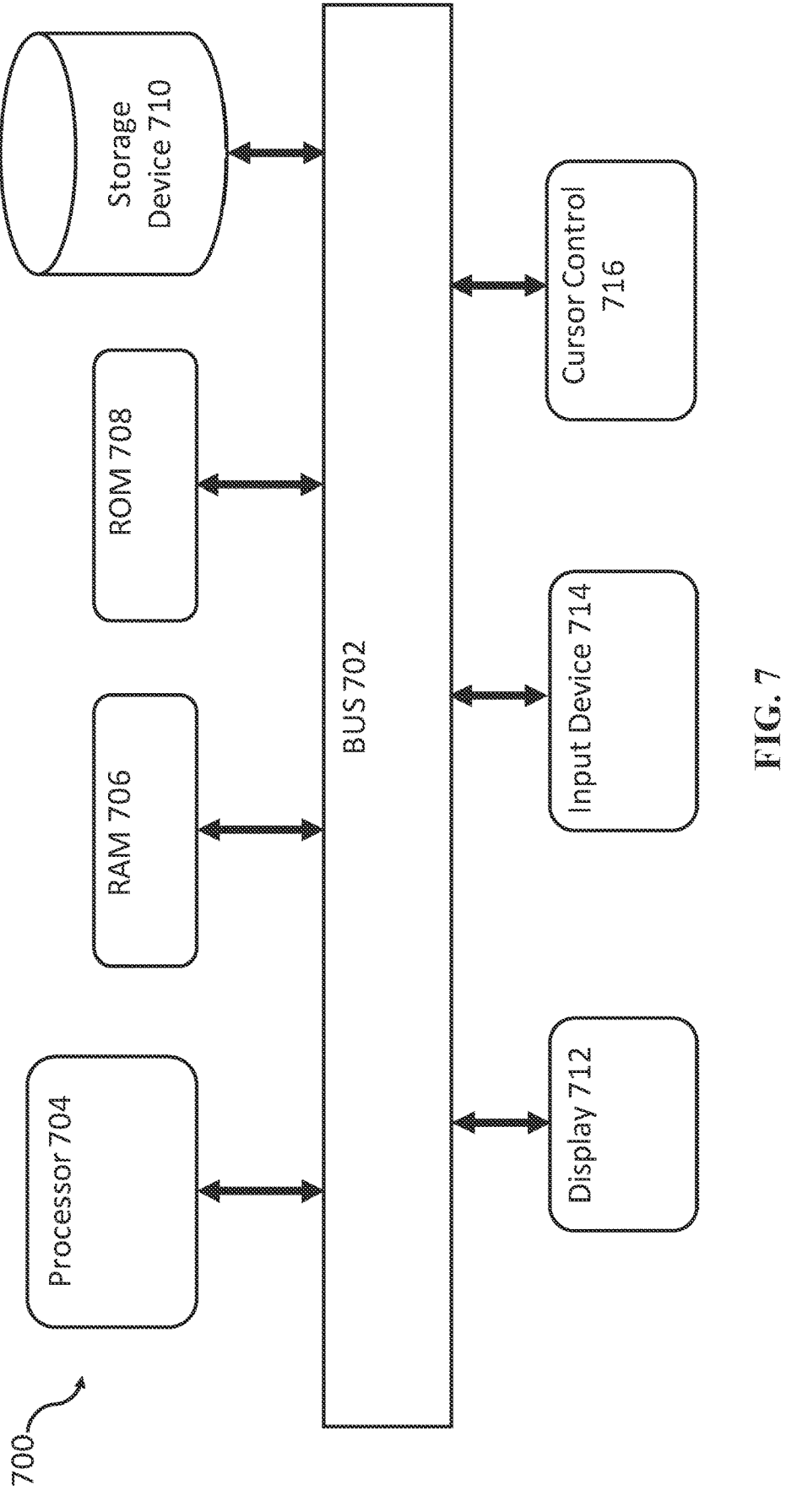
FIG. 7 is a block diagram of a computer system, in accordance with various embodiments.

FIG. 7 is a block diagram of a Computer system in accordance with various embodiments. Computer system 700 may be an example of one implementation for Raman spectra-based chemical compound classification system 100 described above in FIG. 1. In one or more examples, Computer system 700 can include a bus 702 or other communication mechanism for communicating information, and a processor 704 coupled with bus 702 for Processing information. In various embodiments, Computer system 700 can also include a memory, which can be a random-access memory (RAM) 706 or other dynamic storage device, coupled to bus 702 for determining instructions to be executed by processor 704. Memory also can be used for storing temporary variables or other intermediate information during execution of instructions to be executed by processor 704. In various embodiments, Computer system 700 can further include a read only memory (ROM) 708 or other static storage device coupled to bus 702 for storing static information and instructions for processor 704. A storage device 710, such as a magnetic disk or optical disk, can be provided and coupled to bus 702 for storing information and instructions.

In various embodiments, Computer system 700 can be coupled via bus 702 to a display 712, such as a cathode ray tube (CRT) or liquid crystal display (LCD), for displaying information to a Computer user. An input device 714, including alphanumeric and other keys, can be coupled to bus 702 for communicating information and command selections to processor 704. Another type of user input device is a cursor control 716, such as a mouse, a joystick, a trackball, a gesture input device, a gaze-based input device, or cursor direction keys for communicating direction information and command selections to processor 704 and for controlling cursor movement on display 712. This input device 714 typically has two degrees of freedom in two axes, a first axis (e.g., x) and a second axis (e.g., y), that allows the device to specify positions in a plane. However, it should be understood that input devices 714 allowing for three-dimensional (e.g., x, y and z) cursor movement are also contemplated herein.

Consistent with certain implementations of the present teachings, results can be provided by computer system 700 in response to processor 704 executing one or more sequences of one or more instructions contained in RAM 706. Such instructions can be read into RAM 706 from another computer-readable medium or computer-readable storage medium, such as storage device 710. Execution of the sequences of instructions contained in RAM 706 can cause processor 704 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, storage device, data storage device, etc.) or "computer-readable storage medium" as used herein refers to any media that participates in providing instructions to processor 704 for execution. Such a medium can take many forms, including but not limited to, non-volatile media, volatile media, and transmission media. Examples of non-volatile media can include, but are not limited to, optical, solid State, magnetic disks, such as storage device 710. Examples of volatile media can include, but are not limited to, dynamic memory, such as RAM 706. Examples of transmission media can include, but are not limited to, coaxial cables, copper wire, and fiber optics, including the wires that comprise bus 702.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a Computer can read.

In addition to Computer readable medium, instructions or data can be provided as signals on transmission media included in a Communications apparatus or system to provide sequences of one or more instructions to processor 704 of Computer system 700 for execution. For example, a communication apparatus may include a transceiver having signals indicative of instructions and data. The instructions and data are configured to cause one or more processors to implement the functions outlined in the disclosure herein. Representative examples of data Communications transmission connections can include, but are not limited to, telephone modem connections, wide area networks (WAN), local area networks (LAN), infrared data connections, NFC connections, optical Communications connections, etc.

It should be appreciated that the methodologies described herein, flow charts, diagrams, and accompanying disclosure can be implemented using Computer system 700 as a standalone device or on a distributed network of shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a Computer to perform the methods described above. It should be understood that the various engines described herein can be provided on a computer system, such as Computer system 700, whereby processor 704 would execute the analyses and determinations provided by these engines, subject to instructions provided by any one of, or a combination of, the memory components RAM 706, ROM, 708, or storage device 710 and user input provided via input device 714.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

For example, the flowcharts and block diagrams described above illustrate the architecture, functionality, and/or operation of possible implementations of various method and system embodiments. Each block in the flowcharts or block diagrams may represent a module, a segment, a function, a portion of an operation or step, or a combination thereof. In various alternative implementations of an embodiment, the function or functions noted in the blocks may occur out of the order noted in the figures. For example, in various cases, two blocks shown in succession may be executed substantially concurrently. In other cases, the blocks may be performed in the reverse order. Further, in various cases, one or more blocks may be added to replace or supplement one or more other blocks in a flowchart or block diagram.

Thus, in describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular. Generally, nomenclatures utilized in connection with, and techniques of, chemistry, biochemistry, molecular biology, pharmacology and toxicology are described herein are those well-known and commonly used in the art.

As used herein, "substantially" means sufficient to work for the intended purpose. The term "substantially" thus allows for minor, insignificant variations from an absolute or perfect State, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

As used herein, the term "about" used with respect to numerical values or parameters or characteristics that can be expressed as numerical values means within ten percent of the numerical values. For example, "about 50" means a value in the range from 45 to 55, inclusive.

The term "ones" means more than one.

As used herein, the term "plurality" can be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In various cases, "at least one of item A, item B, or item C" means, but is not limited to, two of item A, one of item B, and ten of item C; four of item B and seven of item C; or some other suitable combination.

RECITATION OF EMBODIMENTS

Embodiment 1: A method, comprising: obtaining a Raman spectrum, of an unknown chemical compound, extracted from a Raman spectroscopic measurement of the unknown chemical compound; comparing the obtained Raman spectrum to a reference simulated Raman spectrum of a plurality of simulated Raman spectra contained in a simulated Raman spectrum library, each simulated Raman spectra generated via a quantum-mechanical computation of a known chemical compound; and identifying an identity of the unknown chemical compound based on a comparison of the obtained Raman spectrum to the reference simulated Raman spectrum.

Embodiment 2: The method of embodiment 1, wherein the simulated Raman spectrum library excludes experimental Raman spectra obtained by performing Raman spectroscopic measurements on chemical compounds.

Embodiment 3: The method of embodiments 1 or 2, further comprising: generating a Raman barcode corresponding to peaks of the Raman spectrum based at least in part on intensity levels of the peaks of the Raman spectrum.

Embodiment 4: The method of embodiment 3, wherein the comparing includes comparing the generated Raman barcode to a reference simulated Raman barcode corresponding to the reference simulated Raman spectrum of the plurality of simulated Raman spectra.

Embodiment 5: The method of any one of embodiments 1 to 4, wherein the comparing includes applying a scaling algorithm to the obtained Raman spectrum and/or the reference simulated Raman spectrum to correct a wavenumber offset between the obtained Raman spectrum and/or the reference simulated Raman spectrum.

Embodiment 6: The method of embodiment 4, wherein the identifying includes determining that the unknown chemical compound matches a chemical compound from which the reference simulated Raman spectrum is computed when a barcode overlap level between the generated Raman barcode and the reference simulated Raman barcode exceeds a barcode overlap threshold.

Embodiment 7: The method of embodiment 6, wherein the barcode overlap level indicates a number of bars located at a first wavenumber location of the generated Raman barcode and at a second wavenumber location of the reference simulated Raman barcode, the first wavenumber location and the second wavenumber location being at least substantially equal to each other.

Embodiment 8: The method of any one of embodiments 1 to 7, wherein the quantum-mechanical computation is based on density-functional theory (DFT).

Embodiment 9: The method of embodiment 3, wherein the generating includes including a bar in the Raman barcode, corresponding to a peak of the peaks, when an intensity level of that peak exceeds a peak intensity threshold.

Embodiment 10: The method of embodiment 9, wherein the peak intensity threshold is an average of the intensity levels of the peaks.

Embodiment 11: The method of embodiment 3, wherein the generating includes generating the Raman barcode corresponding to the peaks of the Raman spectrum based at least in part on wavenumber locations of the peaks of the Raman spectrum.

Embodiment 12: A system, comprising: a non-transitory memory storing instructions; and one or more hardware processors coupled to the non-transitory memory and configured to read the instructions from the non-transitory memory to cause the system to perform operations comprising: obtaining a Raman spectrum, of an unknown chemical compound, extracted from a Raman spectroscopic measurement of the unknown chemical compound; comparing the obtained Raman spectrum to a reference simulated Raman spectrum of a plurality of simulated Raman spectra contained in a simulated Raman spectrum library, each simulated Raman spectra generated via a quantum-mechanical computation of a known chemical compound; and identifying an identity of the unknown chemical compound based on a comparison of the obtained Raman spectrum to the reference simulated Raman spectrum.

Embodiment 13: The system of embodiment 12, wherein the simulated Raman spectrum library excludes experimental Raman spectra obtained by performing Raman spectroscopic measurements on chemical compounds.

Embodiment 14: The system of embodiments 12 or 13, wherein the operations further comprise generating a Raman barcode corresponding to peaks of the Raman spectrum based at least in part on intensity levels of the peaks of the Raman spectrum.

Embodiment 15: The system of embodiment 14, wherein the comparing includes comparing the generated Raman barcode to a reference simulated Raman barcode corresponding to the reference simulated Raman spectrum of the plurality of simulated Raman spectra.

Embodiment 16: The system of any one of embodiments 12 to 15, wherein the comparing includes applying a scaling algorithm to the obtained Raman spectrum and/or the reference simulated Raman spectrum to correct a wavenumber offset between the obtained Raman spectrum and/or the reference simulated Raman spectrum.

Embodiment 17: The system of embodiment 15, wherein the identifying includes determining that the unknown chemical compound matches a chemical compound from which the reference simulated Raman spectrum is computed when a barcode overlap level between the generated Raman barcode and the reference simulated Raman barcode exceeds a barcode overlap threshold.

Embodiment 18: The system of embodiment 17, wherein the barcode overlap level indicates a number of bars located at a first wavenumber location of the generated Raman barcode and at a second wavenumber location of the reference simulated Raman barcode, the first wavenumber location and the second wavenumber location being at least substantially equal to each other.

Embodiment 19: The system of any one of embodiments 12 to 18, wherein the quantum-mechanical computation is based on density-functional theory (DFT).

Embodiment 20: The system of embodiment 14, wherein the generating includes including a bar in the barcode corresponding to a peak of the peaks when an intensity level of that peak exceeds a peak intensity threshold.

Embodiment 21: The system of embodiment 20, wherein the peak intensity threshold is an average of the intensity levels of the peaks.

Embodiment 22: The system of embodiment 14, wherein the generating includes generating the Raman barcode corresponding to the peaks of the Raman spectrum based at least in part on wavenumber locations of the peaks of the Raman spectrum.

Embodiment 23: A non-transitory computer-readable medium (CRM) having stored thereon computer-readable instructions executable to cause performance of operations comprising: obtaining a Raman spectrum, of an unknown chemical compound, extracted from a Raman spectroscopic measurement of the unknown chemical compound; comparing the obtained Raman spectrum to a reference simulated Raman spectrum of a plurality of simulated Raman spectra contained in a simulated Raman spectrum library, each simulated Raman spectra generated via a quantum-mechanical computation of a known chemical compound; and identifying an identity of the unknown chemical compound based on a comparison of the obtained Raman spectrum to the reference simulated Raman spectrum.

Embodiment 24: The non-transitory CRM of embodiment 23, wherein the simulated Raman spectrum library excludes experimental Raman spectra obtained by performing Raman spectroscopic measurements on chemical compounds.

Embodiment 25: The non-transitory CRM of embodiments 23 or 24, wherein the operations further comprise generating a Raman barcode corresponding to peaks of the Raman spectrum based at least in part on intensity levels of the peaks of the Raman spectrum.

Embodiment 26: The non-transitory CRM of embodiment 25, wherein the comparing includes comparing the generated Raman barcode to a reference simulated Raman barcode corresponding to the reference simulated Raman spectrum of the plurality of simulated Raman spectra.

Embodiment 27: The non-transitory CRM of any one of embodiments 23 to 26, wherein the comparing includes applying a scaling algorithm to the obtained Raman spectrum and/or the reference simulated Raman spectrum to correct a wavenumber offset between the obtained Raman spectrum and/or the reference simulated Raman spectrum.

Embodiment 28: The non-transitory CRM of embodiment 26, wherein the identifying includes determining that the unknown chemical compound matches a chemical compound from which the reference simulated Raman spectrum is computed when a barcode overlap level between the generated Raman barcode and the reference simulated Raman barcode exceeds a barcode overlap threshold.

Embodiment 29: The non-transitory CRM of embodiment 28, wherein the barcode overlap level indicates a number of bars located at a first wavenumber location of the generated Raman barcode and at a second wavenumber location of the reference simulated Raman barcode, the first wavenumber location and the second wavenumber location being at least substantially equal to each other.

Embodiment 30: The non-transitory CRM of any one of embodiments 23 to 29, wherein the quantum-mechanical computation is based on density-functional theory (DFT).

Embodiment 31: The non-transitory CRM of embodiment 25, wherein the generating includes including a bar in the barcode, corresponding to a peak of the peaks, when an intensity level of the peak exceeds a peak intensity threshold.

Embodiment 33: The non-transitory CRM of embodiment 31, wherein the peak intensity threshold is an average of the intensity levels of the peaks.

Embodiment 33: The non-transitory CRM of embodiment 25, wherein the generating includes generating the Raman barcode corresponding to the peaks of the Raman spectrum based at least in part on wavenumber locations of the peaks of the Raman spectrum.

The invention claimed is:

1. A method, comprising:
   (a) receiving, by one or more computer processors, a Raman spectrum of an unknown chemical compound extracted from an experimental Raman spectroscopic measurement of the unknown chemical compound and a library of simulated Raman spectra, wherein each simulated Raman spectrum of the library of simulated Raman spectra is generated in silico via quantum-mechanical computation of a known chemical compound;
   (b) comparing the Raman spectrum to the each simulated Raman spectrum until a match is found; and
   (c) identifying the unknown chemical compound based on the match.

2. The method of claim 1, wherein the library of simulated Raman spectra excludes experimentally obtained Raman spectra of chemical compounds.

3. The method of claim 1, wherein the comparing further comprises generating:
   (i) a Raman barcode corresponding to peaks of the Raman spectrum, wherein the Raman barcode is based at least in part on intensity levels of the peaks of the Raman spectrum; and
   (ii) a library of simulated Raman barcodes, wherein each simulated Raman barcode of the library of simulated Raman barcodes corresponds to peaks of the each simulated Raman spectrum, and wherein the each simulated Raman barcode is based at least in part on intensity levels of the peaks of the each simulated Raman spectrum.

4. The method of claim 3, wherein the comparing includes comparing the Raman barcode to the each simulated Raman barcode of the library of simulated Raman barcodes.

5. The method of claim 4, wherein the identifying includes determining that the unknown chemical compound matches the known chemical compound from which the each simulated Raman spectrum is computed when a barcode overlap level between the Raman barcode and the each simulated Raman barcode exceeds a barcode overlap threshold.

6. The method of claim 5, wherein the barcode overlap level indicates a number of bars that are located at a first wavenumber location of the Raman barcode and at a second wavenumber location of the each simulated Raman barcode, the first wavenumber location and the second wavenumber location being at least substantially equal to each other.

7. The method of claim 3, wherein the generating includes:
   (i) including a bar in the Raman barcode corresponding to each peak of the peaks, when an intensity level of the each peak exceeds a peak intensity threshold; and (ii) generating the Raman barcode based at least in part on wavenumber locations of the peaks of the Raman spectrum.

8. The method of claim 7, wherein the peak intensity threshold is an average of intensity levels of the peaks.

9. The method of claim 1, wherein the comparing includes applying a scaling algorithm to the Raman spectrum and/or the each simulated Raman spectrum to correct a wavenumber offset between the Raman spectrum and/or the each simulated Raman spectrum.

10. The method of claim 1, wherein the quantum-mechanical computation is based on density-functional theory (DFT).

11. A system, comprising:

a non-transitory memory storing instructions; and one or more hardware processors coupled to the non-transitory memory and configured to read the instructions from the non-transitory memory to cause the system to perform operations comprising:

(a) receiving, by the one or more hardware processors, a Raman spectrum of an unknown chemical compound extracted from an experimental Raman spectroscopic measurement of the unknown chemical compound and a library of simulated Raman spectra, wherein each simulated Raman spectrum of the library of simulated Raman spectra is generated in silico via quantum-mechanical computation of a known chemical compound;

(b) comparing the Raman spectrum to the each simulated Raman spectrum until a match is found; and (c) identifying the unknown chemical compound based on the match.

12. The system of claim 11, wherein the library of simulated Raman spectra excludes experimentally obtained Raman spectra of chemical compounds.

13. The system of claim 11, wherein the comparing further comprises generating:

(i) a Raman barcode corresponding to peaks of the Raman spectrum, wherein the Raman barcode is based at least in part on intensity levels of the peaks of the Raman spectrum; and (ii) a library of simulated Raman barcodes, wherein each simulated Raman barcode of the library of simulated Raman barcodes corresponds to peaks of the each simulated Raman spectrum, and wherein the each simulated Raman barcode is based at least in part on intensity levels of the peaks of the each simulated Raman spectrum.

14. The system of claim 13, wherein the comparing includes comparing the generated Raman barcode to the each simulated Raman barcode of the library of simulated Raman barcodes.

15. The system of claim 14, wherein the identifying includes determining that the unknown chemical compound matches the known chemical compound from which the each simulated Raman spectrum is computed when a barcode overlap level between the Raman barcode and the each simulated Raman barcode exceeds a barcode overlap threshold.

16. The system of claim 15, wherein the barcode overlap level indicates a number of bars that are located at a first wavenumber location of the Raman barcode and at a second wavenumber location of the each simulated Raman barcode, the first wavenumber location and the second wavenumber location being at least substantially equal to each other.

17. The system of claim 13, wherein the generating includes:

(i) including a bar in the Raman barcode corresponding to each peak of the peaks, when an intensity level of the each peak exceeds a peak intensity threshold; and (ii) generating the Raman barcode based at least in part on wavenumber locations of the peaks of the Raman spectrum.

18. The system of claim 17, wherein the peak intensity threshold is an average of intensity levels of the peaks.

19. The system of claim 11, wherein the comparing includes applying a scaling algorithm to the Raman spectrum and/or the each simulated Raman spectrum to correct a wavenumber offset between the Raman spectrum and/or the each simulated Raman spectrum.

20. The system of claim 11, wherein the quantum-mechanical computation is based on density-functional theory (DFT).

21. A non-transitory computer-readable medium (CRM) having stored thereon computer-readable instructions executable to cause performance of operations, the operations comprising:

(a) receiving, by one or more computer processors, a Raman spectrum of an unknown chemical compound extracted from an experimental Raman spectroscopic measurement of the unknown chemical compound and a library of simulated Raman spectra, wherein each simulated Raman spectrum of the library of simulated Raman spectra is generated in silico via quantum-mechanical computation of a known chemical compound;

(b) comparing the Raman spectrum to the each simulated Raman spectrum until a match is found; and (c) identifying the unknown chemical compound based on the match.

\* \* \* \* \*